(12) United States Patent
Samuel (10) Patent No.: US 9,839,197 B1
(45) Date of Patent: Dec. 12, 2017

(54) LOST AND FOUND NOTIFICATIONS FOR PETS BASED ON GEOLOCATION AND PROFILE INFORMATION

(71) Applicant: BarkHappy Inc., Austin, TX (US)

(72) Inventor: Ninis Samuel, Austin, TX (US)

(73) Assignee: BarkHappy Inc., Austin, TX (US)

( * ) Notice: Subject to any disclaimer, the term of this patent is extended or adjusted under 35 U.S.C. 154(b) by 0 days.

(21) Appl. No.: 15/614,906

(22) Filed: Jun. 6, 2017

Related U.S. Application Data (60) Provisional application No. 62/346,912, filed on Jun. 7, 2016.

(51) Int. Cl.
*A01K 11/00* (2006.01)
*G01S 5/00* (2006.01)
*G06F 17/30* (2006.01)
*G06Q 50/26* (2012.01)
*A01K 15/02* (2006.01)

(52) U.S. Cl.
CPC .......... *A01K 11/008* (2013.01); *A01K 15/021* (2013.01); *G01S 5/0054* (2013.01); *G06F 17/30861* (2013.01); *G06Q 50/26* (2013.01)

(58) Field of Classification Search
CPC ... A01K 11/008; A01K 15/021; G01S 5/0027; G01S 5/0054; G01S 5/0284; G01S 5/0294; G01S 13/825
See application file for complete search history.

(56) References Cited

U.S. PATENT DOCUMENTS

| | | | |
|---|---|---|---|
| 9,384,654 B1* | 7/2016 | Chillappa | G06Q 10/08 |
| 2006/0224625 A1* | 10/2006 | Warner | G06Q 50/26 |
| 2008/0143516 A1* | 6/2008 | Mock | G01S 5/0294 |
| | | | 340/539.14 |
| 2015/0053760 A1* | 2/2015 | Ng | A01K 15/021 |
| | | | 235/380 |

\* cited by examiner

*Primary Examiner* — Orlando Bousono
(74) *Attorney, Agent, or Firm* — Garlick & Markison; Harry S. Tyson, Jr.

(57) ABSTRACT

An infrastructure and methodologies to support automated lost and found pet alerts based on geo-proximity and other criteria. In various embodiments, a pet/dog owner initiates a lost pet alert by entering location and lost pet report information via a downloadable application. This information is processed and stored in a database maintained by a cloud/remote server. The server identifies potential recipients for a lost pet alert and transmits alerts for display on user devices meeting select criteria such as proximity thresholds. Upon receiving a found pet report, the server sends an automated found pet notice to the owner of the animal and other users meeting predetermined criteria. Curated listings of lost and found pet notifications may also be maintained for selective presentation on user devices.

17 Claims, 10 Drawing Sheets

LOST AND FOUND NOTIFICATIONS FOR PETS BASED ON GEOLOCATION AND PROFILE INFORMATION

CROSS REFERENCE TO RELATED APPLICATIONS

The present U.S. Utility Patent Application claims priority pursuant to 35 U.S.C. §119(e) to U.S. Provisional Application No. 62/346,912, entitled "LOST AND FOUND NOTIFICATIONS FOR PETS BASED ON GEOLOCATION AND PROFILE INFORMATION", filed Jun. 7, 2016, which is hereby incorporated herein by reference in its entirety and made part of the present U.S. Utility Patent Application for all purposes.

BACKGROUND OF THE INVENTION

Technical Field of the Invention

The present invention relates generally to social networking systems and, more particularly, to automated lost and found notifications for pets based on geolocation and social profile information.

Description of Related Art

Pet owners often confront the distressing problem of a lost animal, such as a dog or cat. Unfortunately, the existing options for alerting others about a lost pet can be time consuming and largely rely on serendipity for success. For example, pet owners often post missing signs in their local neighborhoods, and may create postings on websites and social network sites, such as FACEBOOK® or CRAIGSLIST®, to enlist help in locating a lost pet. Using dogs as an example, most do not have GPS tracking devices, and many do not wear proper identification tags and have not been implanted with an identification microchip. Even when a lost dog is equipped with such identification, someone locating or sheltering the dog has limited ability to the unite dog with its owner.

In many popular social networks, especially profile-centric social networks, activity centers on web pages or social spaces that enable members to manage their own profile, view profiles of others, and communicate and share activities, interests, opinions, status updates, audio/video content, etc. Social networking services may also allow members to track certain activities of other members of the social network, collaborate, connect with existing friends, former acquaintances and colleagues, and establish (via first-person profiles) new connections with other members or dating prospects.

Individual members typically connect to hosted social networking services through existing web-based platforms via a computing device, tablet or smartphone. In so-called "cloud" computing, relevant computing tasks are performed, in a centralized manner, on remote computers/servers which are typically accessed via Internet connections and (virtualized) network infrastructures. One benefit of cloud computing is that it may reduce the relative processing and storage capabilities required by user devices (e.g., a cloud computer may load a webpage or other information accessed by a tablet device and communicate only required information back to the tablet device). Accordingly, recent years have witnessed an ever-growing amount of content, application software and back-end processing being migrated from local to cloud-based data storage and management. Cloud-based services, software and content are typically available on-demand.

DETAILED DESCRIPTION OF THE INVENTION

In various embodiments of the technology described herein, an infrastructure and methodologies are provided to support the creation of lost and found pet notifications for communication to, for example, a specific community of pet owners. The disclosed technology permits novel interaction between pet owners and others that may be of help in locating and retrieving a lost pet.

Briefly, in exemplary embodiments a mobile device user initiates a lost pet report or a found pet report by entering relevant lost pet report information through a downloadable mobile application. Such information may include a pet's name, physical characteristics and breed, a photo, owner contact information, reward information, as well as the geolocation of where the pet was last seen. In the case of found pet, location information may likewise be provided by other mobile device users.

Such information may be stored in profile databases maintained by and accessible to a central or cloud/remote server ("server") that supports the mobile application. Among other functions, the server operates to generate and curate lists of lost or found pet reports and proactively identify target recipients of lost pet or found pet alerts/notifications based on geolocation information and other criteria associated with such reports. In certain embodiments, one or more proximity thresholds may also be utilized to limit notifications to mobile devices based on geolocation information.

Upon identifying a group of users/mobile devices within a proximity threshold of a lost pet report and/or meeting other criteria, the server generates an automated lost pet alert (also referred to herein as a "lost pet notification") that is communicated to mobile devices associated with users identified group of users. The notification may be automatically displayed upon receipt by an appropriately configured mobile device. A lost or found pet notification may present recipients with various options for viewing lost and found pet report information. Various options for interacting with the owner of the lost pet or found pet may also be presented (e.g., within a lost/found pet alert) as described in greater detail below.

In one embodiment, the server automatically sends text and/or sound push notifications to a mobile device when a lost or found pet is reported in proximity and ready to be viewed. Such notifications may generally relate to a single lost pet or found pet, and may be sent once or on a repeated basis. Subsequent reminders may be communicated to the mobile device. In certain embodiments, lost and found pet alerts may be communicated on a daily basis in near real time as report information is received. Alerts may also be curated by a remote server in an inclusive list for on demand viewing.

While various devices (such as mobile phones, wearable technology, tablet computing devices (tablets), personal computers (PCs)) are described, other devices not described herein may be used in the interactions described in this disclosure. In addition, although implementation examples are noted herein, the implementation is not limited to such disclosed embodiments.

Further, the embodiments described below may be practiced in a variety of networks that utilize wireless, wired or optical connections, or any combinations thereof. For example, the illustrated communication links may utilize one or more of various transmission media—such as wireless media (radio frequencies, microwave, satellite, infrared, etc.), coaxial cable, shielded twisted pair cable, fiber-optic cable, and power line wires—and operate in accordance with a variety of communication and networking protocols (TCP/IP, UPnP, IPv6, etc.) and standards (3G, 4G, IMT-Advanced, DOCSIS, xDSL, Wi-Fi/802.11x, WiMax, Bluetooth, NFC, etc.). In addition, the communication links may comprise a picocell, femtocell, metrocell, heterogeneous network (HetNet) and/or multi-hop network utilizing a spanning tree protocol, direct wireless connections, peer-to-peer links, etc. One or more of such networks may include the Internet and/or the World Wide Web ("web"), and may be public, private, virtual or any combination thereof.

As used herein, the term "owner" or "user" may include one or more human owners or caretakers of a particular pet that is missing, or a person that has located or is harboring a lost pet. Other entities, such as an animal shelters, vets, or other businesses, may likewise participate in the alert system and submit lost and found information for dogs (or other animals) that can be used for lost or found pet alerts.

Further, the term "pet" as used herein includes, but is not limited to, dogs, cats and other animals. In addition, the systems and methodologies described herein may also be extended to other entities, such as human babies, children, and adults having special needs. The following disclosure references dogs as exemplary pets.

Figure 1:
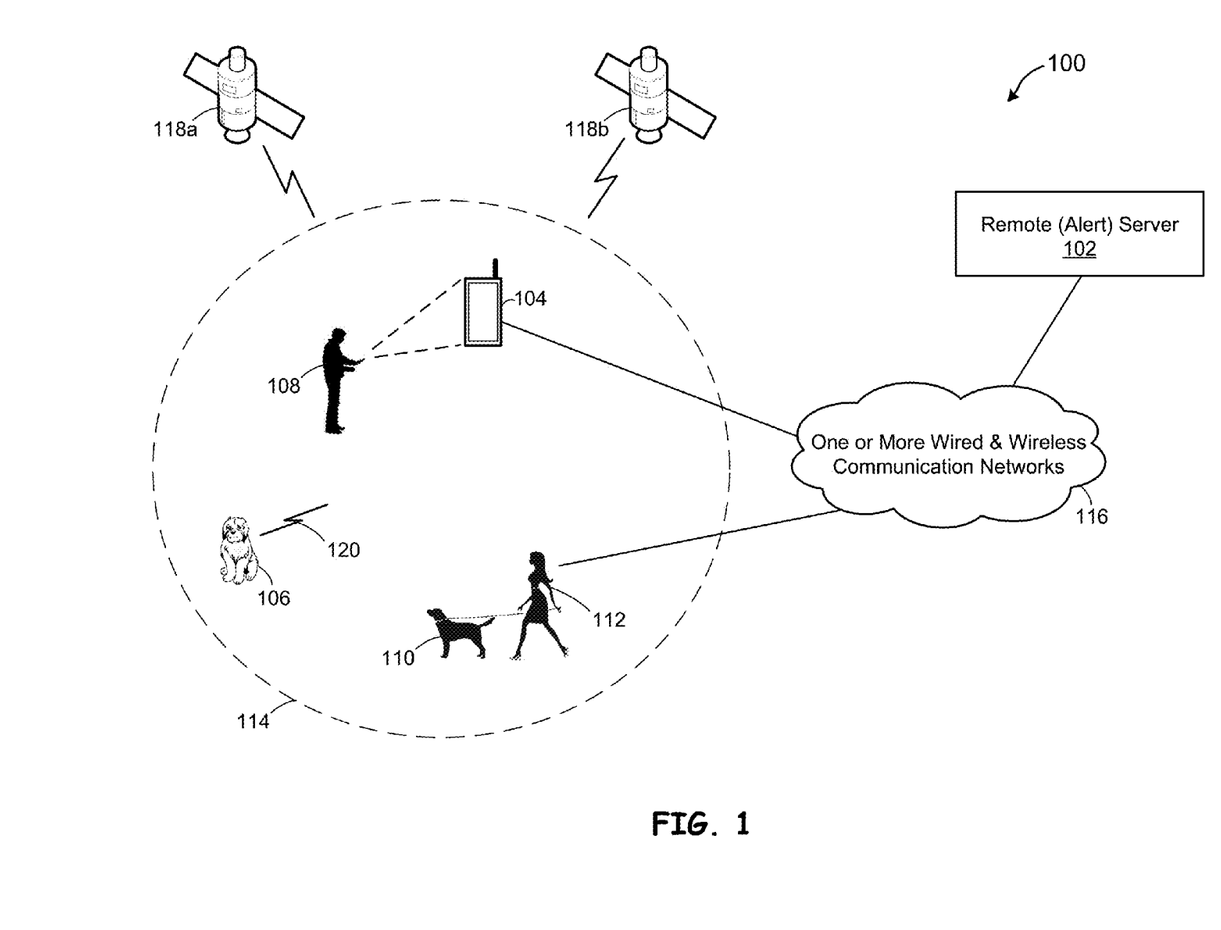
FIG. 1 illustrates an exemplary network providing automated lost and found pet alerts in accordance with an embodiment of the present disclosure.

Referring more particularly to FIG. 1, an exemplary network 100 providing automated lost and found pet alerts in accordance with an embodiment of the present disclosure is shown. The exemplary network 100 targets qualifying users within a boundary 114. The illustrated embodiment includes a remote server 102 configured to perform alert processing operations, as well as a mobile device 104 associated with an owner 108 reporting a lost dog 106. The remote server 102 and mobile device 104 are configured to operate with one or more wired and wireless communication links 116, which may be one or more of a variety of networks such as described above. In the embodiment of network 100, the mobile device 104 may be a smartphone, tablet device, wearable communication device or the like that includes functionality allowing the owner 108 to enter lost dog information and profiling/preference information for the lost dog 106. The lost dog 106 may be fitted with a tracking device or like technology that provides and/or receives short range and/or long range tracking information 120. Such tracking information 120 may be received, for example, by appropriately configured mobile devices or stationary transceivers, and incorporated in lost or found pet alerts.

Various devices within network 100 may have geographical location (geolocation) capabilities to determine the location of the respective devices in a relevant area. In the example of network 100, the mobile device 104 of owner 108, as well as a mobile device the owner 112 of a pet 110 may be linked to GPS satellites 118a and 118b to obtain GPS geolocation information. Timing signals from multiple such GPS satellites may be used to determine the geolocation of a device and generate geospatial metadata. While this data typically comprises latitude and longitude coordinates, it may also include location names and altitude, bearing, distance, and like data. Other technology and methods for determining geolocation information are described herein. In the illustrated example, the mobile device 104 is within a boundary 114 defining a geographical region or area corresponding to a proximity threshold for use by remote server 102 in filtering and targeting users for receipt of lost pet notifications as described more fully below.

Figure 2:
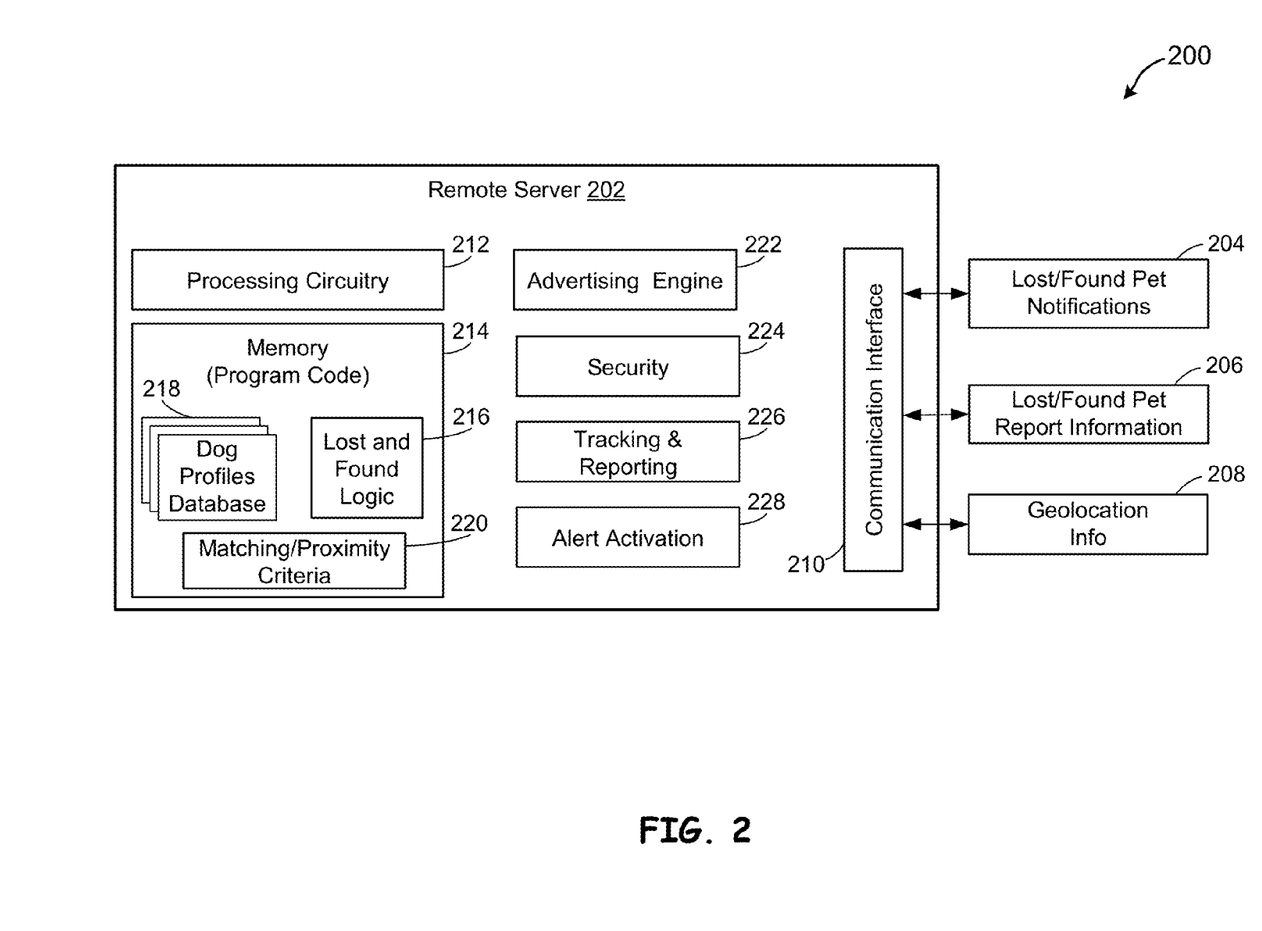
FIG. 2 is a functional block diagram representation of a server for generating and providing lost and found pet notifications in accordance with an embodiment of the present disclosure.

FIG. 2 is a functional block diagram representation 200 of a server 202 for generating and providing lost and found pet notifications in accordance with an embodiment of the present disclosure. In this example, the server 202, which may be local, remote or combinations thereof, is operable to output and/or receive lost and found pet notifications 204, lost/found pet report information 206, and related geolocation information 208 via a communication interface 210.

The server 202 includes processing circuitry 212 and memory 214 for storing both program code utilized by the processing circuitry 212 and other data relating to server operations. In the illustrated embodiment, memory 214 includes lost and found logic 216, as well as a database 218 of pet/user profiles and proximity criteria 220 for use by the lost and found logic 216 to identify mobile devices for receiving lost and found pet notifications based on, for example, an associated zip code or last known geolocation. Exemplary operation of the lost and found logic 216 is described more fully below in conjunction with FIGS. 3 and 4.

In addition, the illustrated server 202 includes various functionality/modules for supporting lost and found pet alert operations and fee-based services. In particular, an advertising engine 222 is provided to support in-application advertisements (e.g., when a mobile device is utilizing a free version of a downloadable application that includes lost and found pet alert capabilities), advertising fee billing and invoicing. The advertising engine 222 may perform other services, such as providing support for competitive bidding for advertising by dog-friendly business, advertisement notifications areas, search terms and phrases, search categories, etc. Such services may be securely performed through the use of various security functions provided by security module 224. Security module 224 may also perform user verification/authentication operations and provide restricted access to owner and pet profile information.

In various embodiments, the server 202 also includes a tracking and reporting module 226 configurable to track owner mobile devices and/or pets having an established profile. The tracking and reporting module 226 may perform other functions such as measuring and generating advertising/marketing campaign statistics for use by advertisers, logging of fee-based interaction with the automated lost and found pet alert system, etc. A lost and found pet alert activation module 228 is also provided for performing lost and found pet notifications and monitoring operations (e.g., activating lost and found pet notifications upon power-on of a relevant mobile device or entry of a mobile device or pet into a particular geographic area).

It is noted that processing circuitry 212 may comprise standalone or distributed hardware, hardware and software, applications executed by processing circuitry, or various combinations thereof, and be configurable to support various functionalities disclosed herein. Further, processing circuitry 212 may be included in a standalone server, cloud-based server farm, and/or the various types of other types of devices (for example, certain operations described as being performed by the server 202 may instead be performed in a computing device associated with a dog owner).

Figure 3:
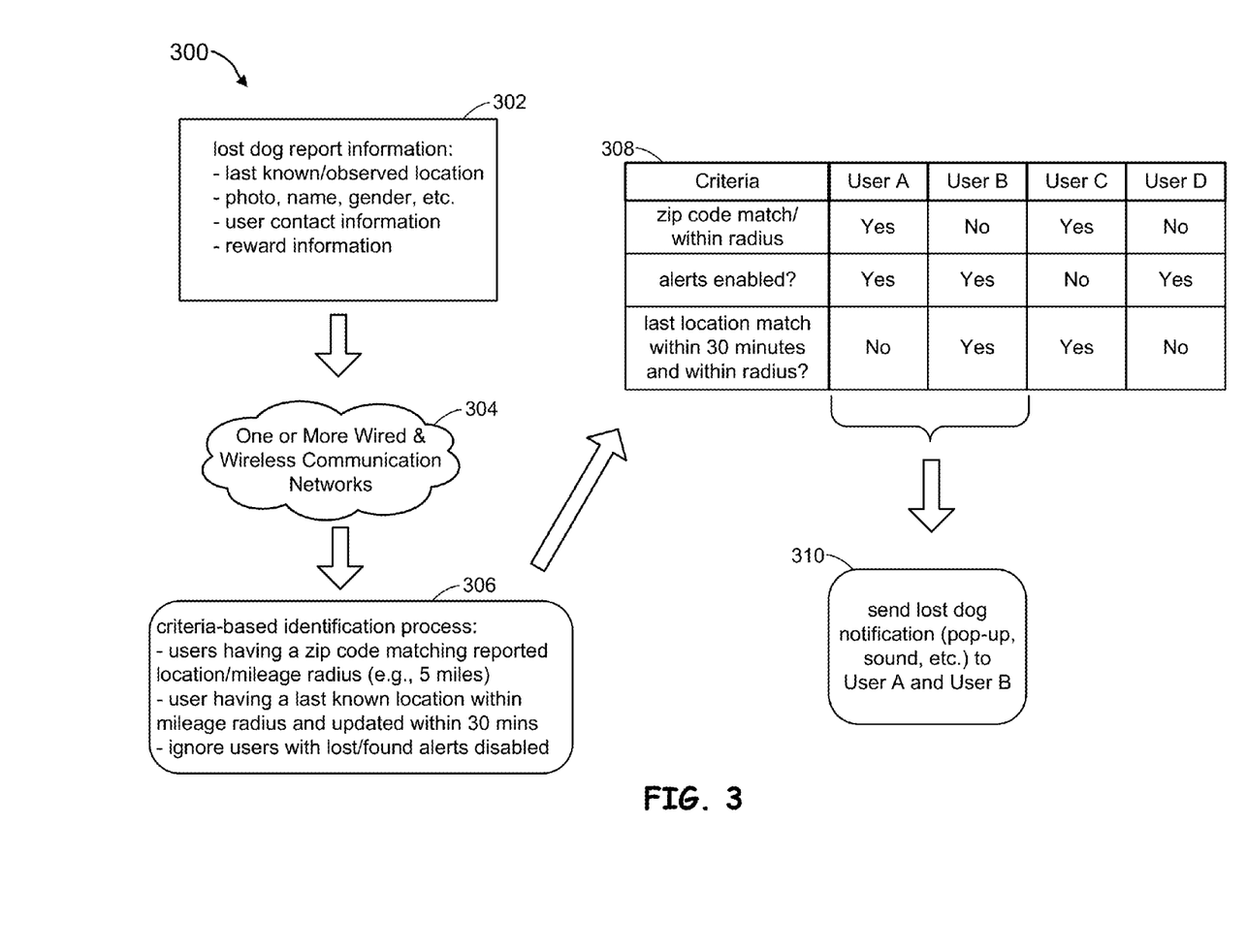
FIG. 3 is an operational flow diagram illustrating a method for performing lost pet alert operations utilizing exemplary alert criteria and proximity thresholds in accordance with an embodiment of the present disclosure.

FIG. 3 is an operational flow diagram illustrating a method 300 for performing lost pet notification operations utilizing exemplary alert criteria and proximity thresholds in accordance with an embodiment of the present disclosure. The method may be performed, for example, by the lost and found pet alert logic 216 of the server 202 of FIG. 2 or, to varying degrees, by a computing device or mobile device associated with an owner of a pet.

In operation, lost dog report information is generated at step 302 by a pet owner. The lost dog report information may include, for example, dog profile information, owner contact information, reward information, and geolocation information including information relating to the last known location of the lost dog. Such information may be provided, for example, over one or more wired and wireless communication networks 304 via a mobile device including a downloadable application that facilitates entry of profile information regarding dog, or derived from other sources or databases.

In various embodiments, the remote server 202 may maintain profile information for use in generating lost and found pet notifications. Such profile information may include an individual/stand-alone profile for a given pet, a sub-profile of a pet that is associated with an owner profile, etc. Profile information may include zip code and recent geolocation information for use in a criteria-based identification process 306. All or only a portion of a pet's profile information may be used in generating lost and found pet notifications.

In certain embodiments, lost and found pet alert criteria are established for use in identifying lost pet notification recipients based on profile information and geolocation information. For example, a proximity threshold or radius (e.g., 5 miles) is established relative to a last known location of a missing pet. The proximity threshold may be determined, for example, based on configurable settings in a remote server that may account for owner preference information. In some embodiments, zip code information may be used by the lost and found logic 216 in lieu of real time or previously stored geo-location information to perform proximity determinations in order to conserve the battery life of owners' mobile devices, or in the event real time geolocation information is unavailable (e.g., a device is in a reduced power state, or user preference information does not permit sharing of real time location information).

In an example, the lost and found pet alert criteria are utilized in step 308 to identify recipients of a lost pet notification based on geolocation information. Relevant geolocation information may comprise, for example, zip code or other address information provided by a dog owner, real-time geolocation data from a mobile device or a tracking device affixed to a pet, or historical geolocation data.

Based on the relevant geolocation information, a determination is made that the certain groups of users are within the relevant proximity threshold. If such users have lost/found pet alerts enabled, they will qualify for receiving a lost pet notification. In the illustrated example, User A and User B are determined to be within a proximity threshold and have alerts enabled. In response, the server 202 communicates (e.g., via one or more wired and wireless communication networks 304) a lost pet notification to one or more mobile devices associated with User A and User B at step 310.

Figure 4:
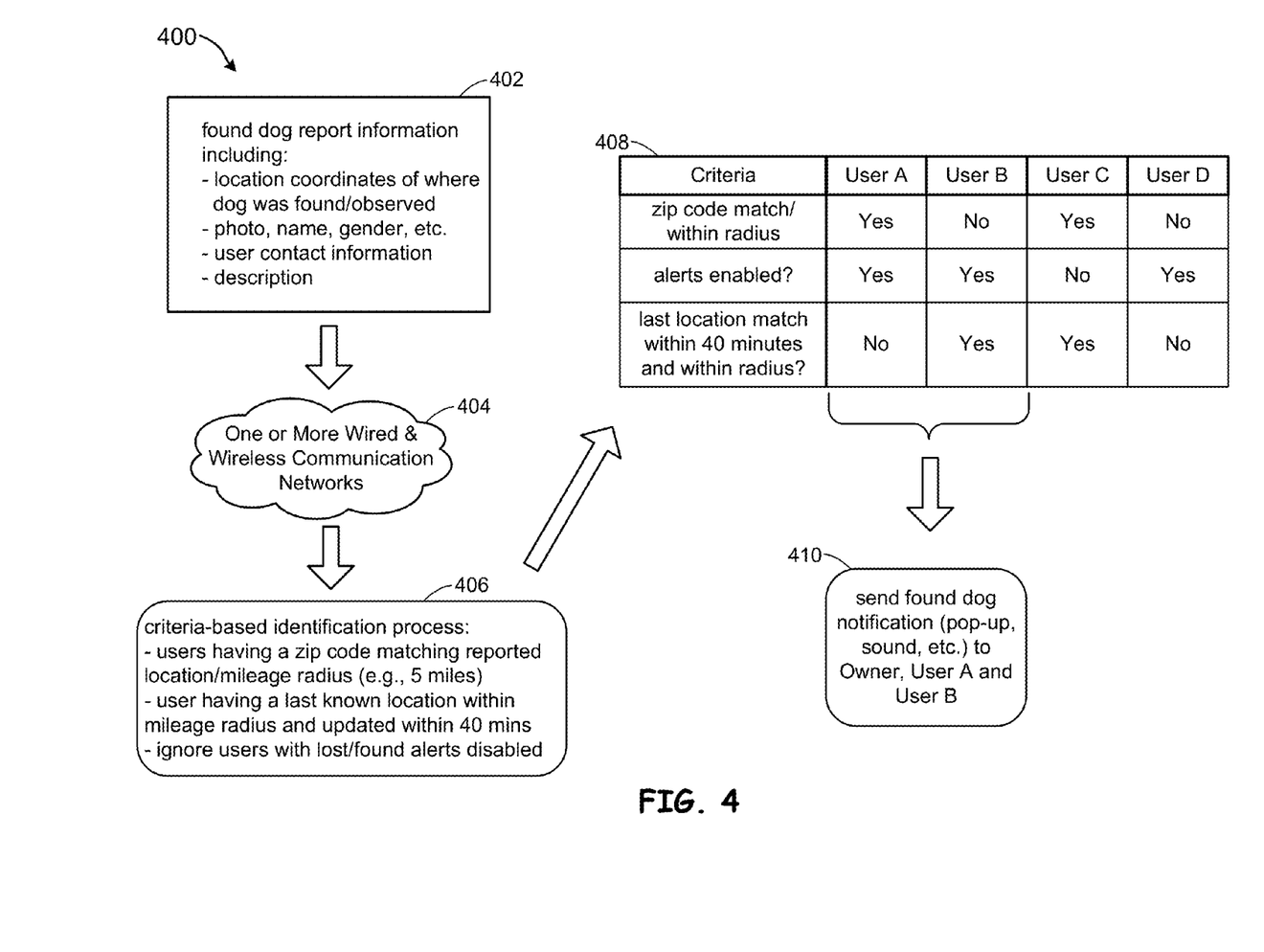
FIG. 4 is an operational flow diagram illustrating a method for performing found pet notifications operations utilizing exemplary alert criteria and proximity thresholds in accordance with an embodiment of the present disclosure.

FIG. 4 is an operational flow diagram illustrating a method 400 for performing found pet notification operations utilizing exemplary alert criteria and proximity thresholds in accordance with an embodiment of the present disclosure. The lost and found pet alert criteria may be utilized in lost and found pet alert operations performed, for example, by the lost and found logic 216 of FIG. 2 or, to varying degrees, by a computing device or mobile device associated with an owner of a pet.

In operation, found dog report information is generated at step 402 by a user of a mobile device. The found dog report information may include, for example, information such as a photo of the found dog, name of the dog (e.g., as identified on a dog tag or by a tracking device), gender and approximate age of the dog, geolocation information including information relating to the current location of the found dog, contact information for the finder of the dog, etc. Such information may be provided, for example, over one or more wired and wireless communication networks 404 via a mobile device including a downloadable application that facilitates entry of profile information regarding dog, or derived from other sources or databases.

In the illustrated embodiment, exemplary lost and found pet alert criteria (including a proximity threshold) is utilized in steps 406 and 408 to identify recipients of a found pet notification. Such criteria may include, for example, zip code and/or GPS information from mobile devices and/or pet tracking devices. In some embodiments, zip code information may be used by the lost and found logic 216 in lieu of real time or previously-stored geo-location information to perform proximity determinations in order to conserve the battery life of owners' mobile devices, or in the event real time geolocation information is unavailable.

In the illustrated example of step 408, User A and User B are determined to be within a proximity threshold and have alerts enabled. In response, the server 202 communicates (e.g., via one or more wired and wireless communication networks 404) a lost pet notification to one or more mobile devices associated with User A and User B at step 410. In this example, lost and found pet alert criteria include preset/configurable criteria fields relating to a proximity threshold, alert enabled status, and timing of a last known location. The proximity field is set to five (5) miles and/or a matching zip code. In order to be considered qualified to receive a lost and found pet alert, a user/mobile device may have to pass a geolocation/proximity check.

Based on the foregoing, application of the lost and found pet alert criteria to profile information for Users A-D results in the exclusion of User C and User D as recipients of a lost pet alert due to lack of proximity/zip code match or alerts being disabled.

In alternate embodiments, further processing operations may be performed such that only one lost or found pet notification is generated. For example, if a lost or found pet notification for a dog has previously been communicated to a particular device, further alerts may be suppressed. In addition, it is noted that the found pet notification operations may be performed on a standalone basis that is not contingent on a corresponding lost pet report.

Figure 5:
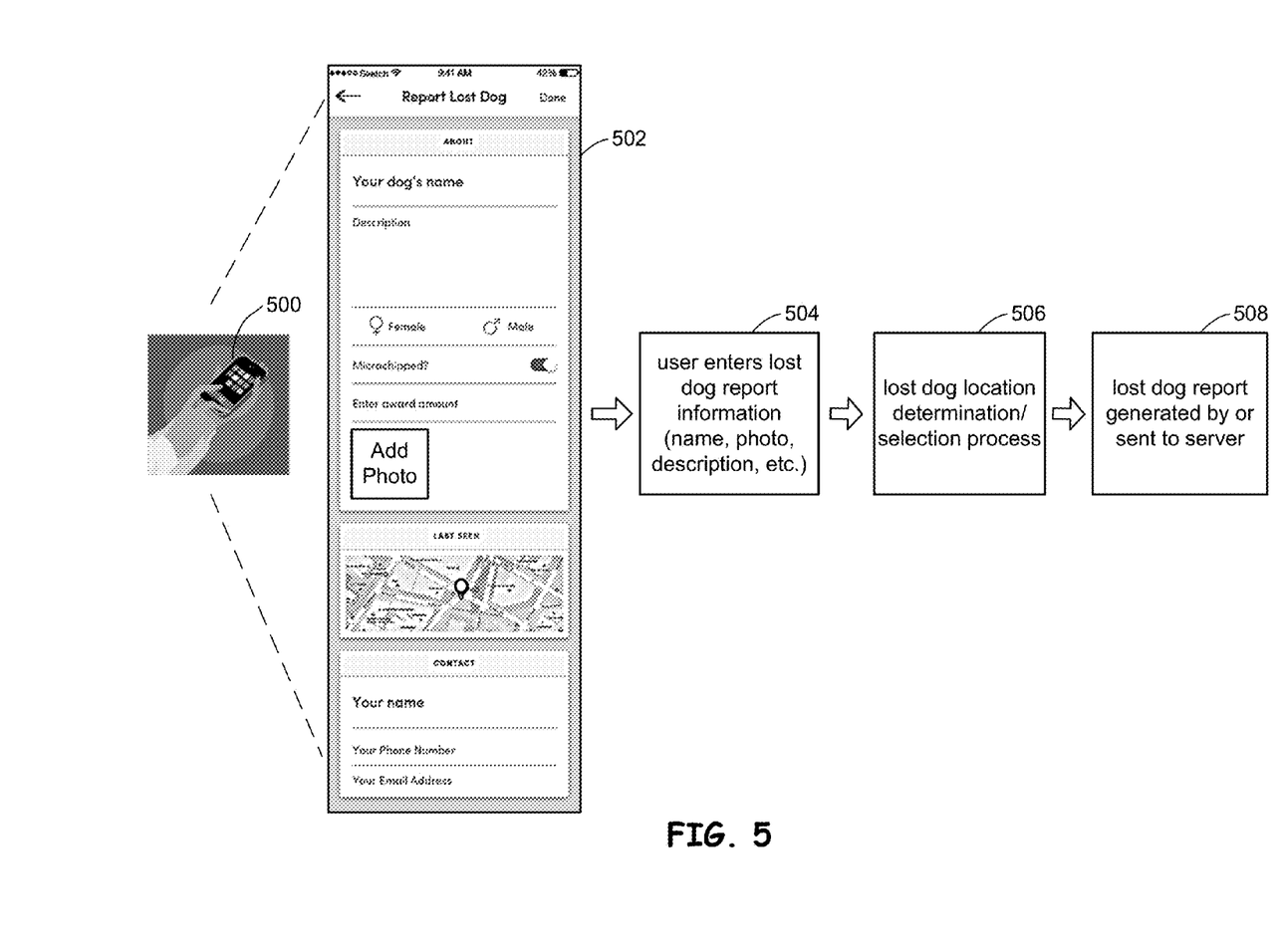
FIG. 5 illustrates an exemplary user interface presented on a mobile device for establishing lost pet report information in accordance with an embodiment of the present disclosure.

FIG. 5 illustrates an exemplary user interface 502 presented on a mobile device 500 for establishing lost pet report information in accordance with an embodiment of the present disclosure. In the illustrated embodiment, the user interface 502 may be a feature of and invoked by a software program or downloaded application, such as the BARKHAPPY® application, that includes various other additional features, including features based upon profiles established for dogs.

In the illustrated embodiment, at step 504 a user enters lost dog report information such as a name, photo, brief description, contact information, reward information, etc. As described more fully in conjunction with FIG. 7, the example user interface 502 permits a user to input geolocation information (step 506) relating to a lost pet by selecting a location on a map. A user of the mobile device can confirm a particular location to include in lost pet report information as a last known location. Alternatively, geolocation information may be derived from information received from a tracking device affixed to the lost pet or retrieved from a profile database. The lost dog report information is included in a lost dog report generated or transmitted to a remote server at step 508.

It is noted that the lost pet information described herein is non-inclusive, and other information might also be incorporated into a dog's lost pet report for use in generating lost and found pet alerts. In addition, the downloadable application can be constructed for use on a wide variety of platforms or operating systems including, by way of example and without limitation, iOS, Android, and Windows-based platforms or other proprietary or open source software platforms or web-based code.

Figure 6:
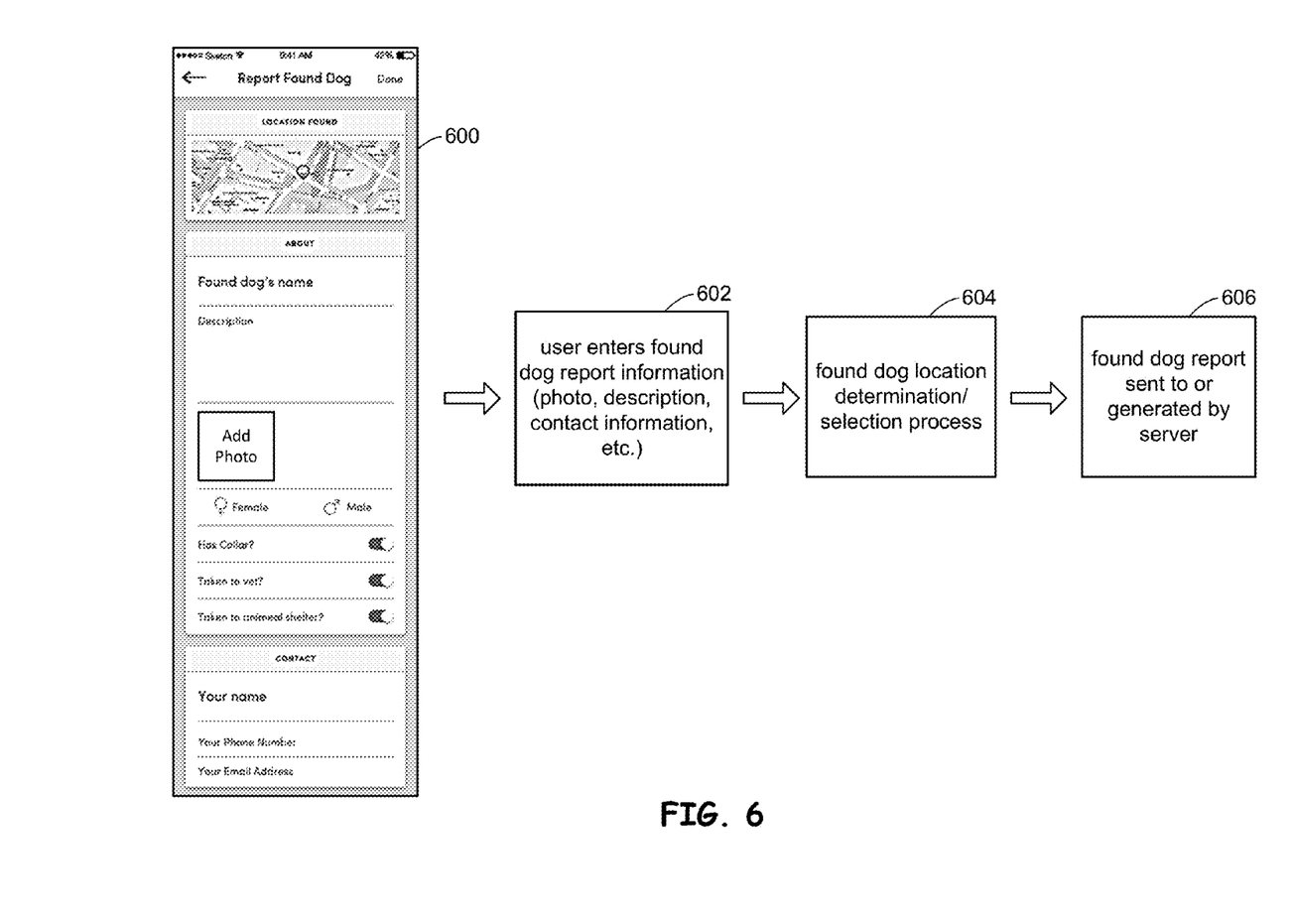
FIG. 6 illustrates an exemplary user interface presented on a mobile device to support entry of found pet report information in accordance with an embodiment of the present disclosure.

FIG. 6 illustrates an exemplary user interface 600 presented on a mobile device to support entry of found pet report information in accordance with an embodiment of the present disclosure. In this example, at step 602 a user enters location and other found pet report information relating to a found dog. The found pet report information may include, without limitation, a photograph and description of a found dog, contact information for a user of the mobile device, etc.

The user may also enter location information (step 604) for the found dog, or such information may be derived from information received from a tracking device affixed to the lost pet or retrieved from a profile database that includes location information for the mobile device. The found pet report information is used in the preparation of a found pet report (generated by or transmitted to a remote server at step 606) which, in turn, is used to provide found pet notifications to qualified users meeting established selection criteria (e.g., the pet owner(s) and previous recipients of a lost pet notification).

Figure 7:
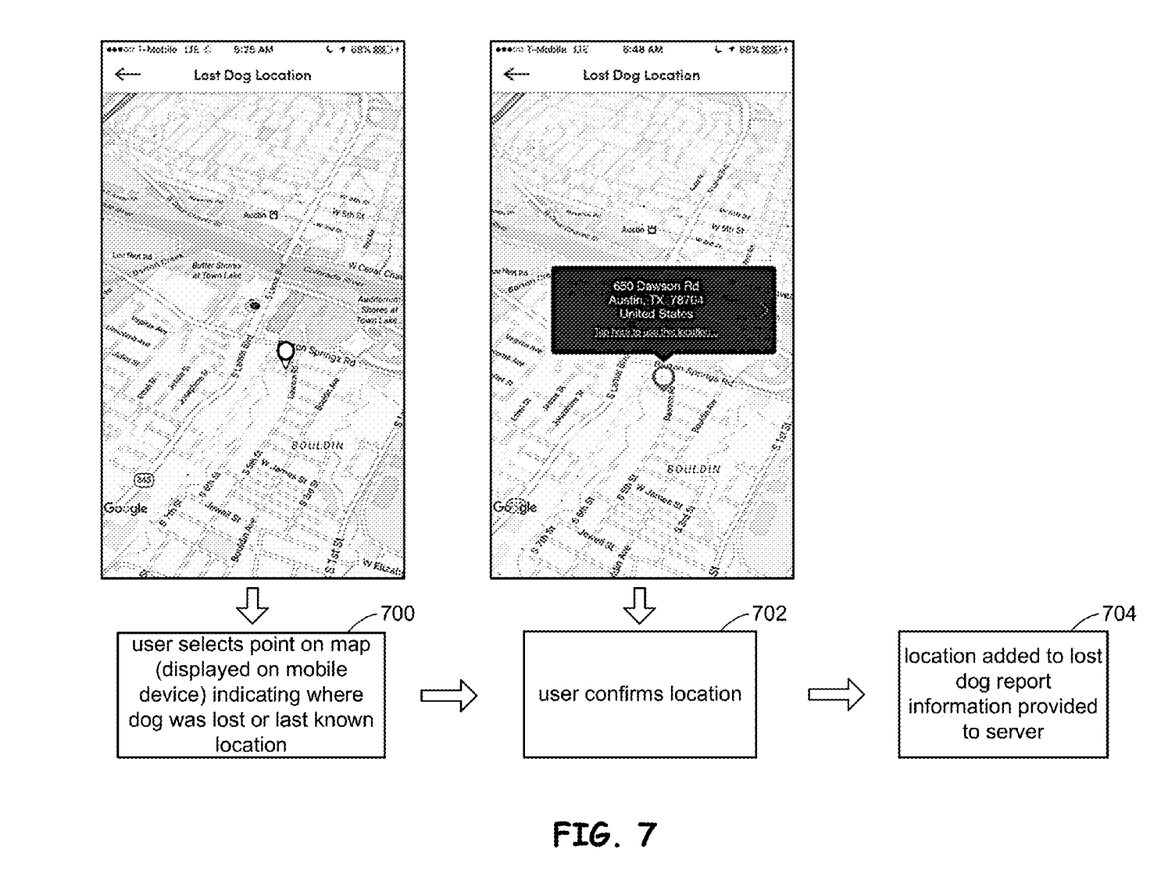
FIG. 7 shows screens shots illustrating options for user entry of lost pet geolocation information as presented on a mobile device in accordance with an exemplary embodiment of the present disclosure.

FIG. 7 shows screens shots illustrating options for user entry of lost pet geolocation information as presented on a mobile device in accordance with an exemplary embodiment of the present disclosure. In this example, at step 700 a mobile device user selects a point on a map displayed on the mobile device in order to indicate a last known location for a lost dog. Next, at step 702, an address or other location indicator corresponding to the selected point is presented on the user interface and confirmed by the user. When confirmed, the location is added to lost dog report information provided to a remote server at step 704. A similar process may be utilized to determine geolocation information for a found dog report.

Figure 8:
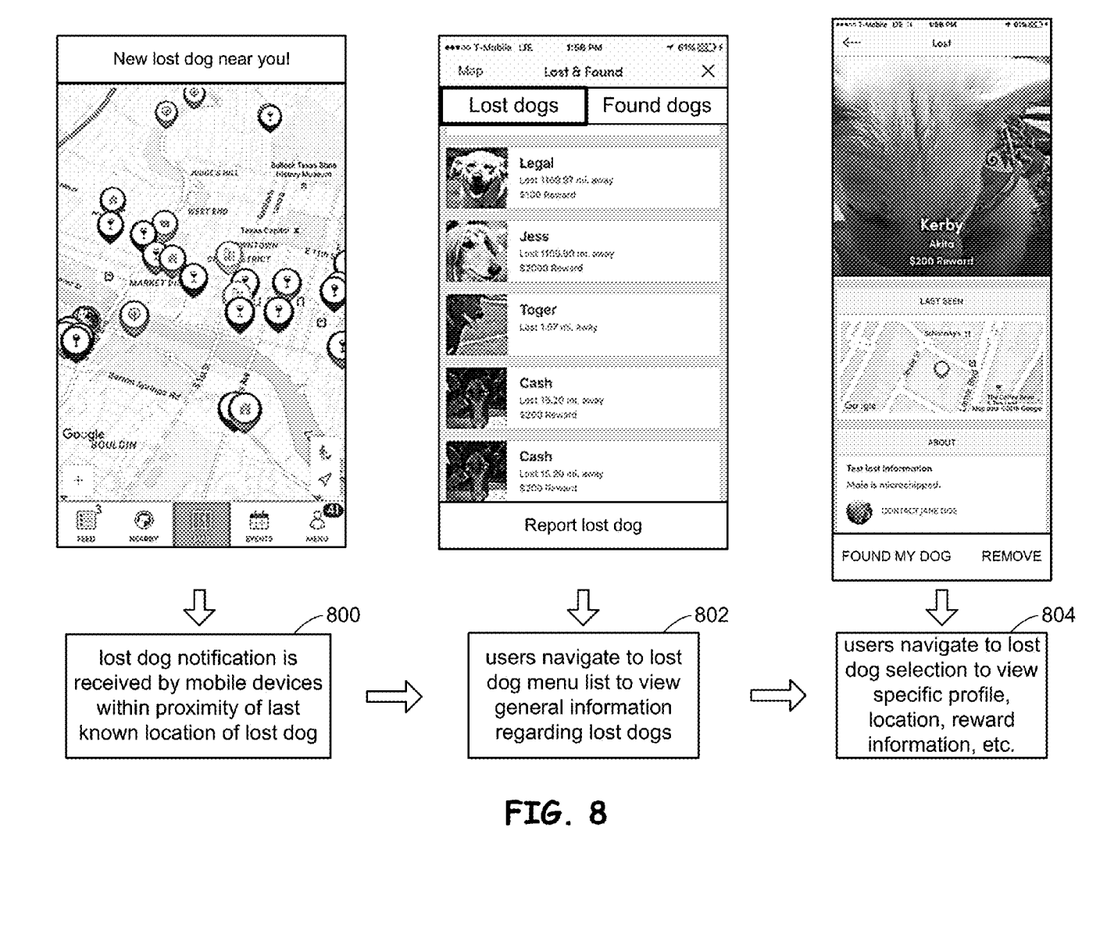
FIG. 8 shows screens shots illustrating options for user selection and display of lost pet notifications as presented on a mobile device in accordance with an exemplary embodiment of the present disclosure.

FIG. 8 shows screens shots illustrating options for user selection and display of lost pet notifications as presented on a mobile device in accordance with an exemplary embodiment of the present disclosure. In particular, various lost pet notifications may be accessible under or automatically displayed through an alert section of a user interface.

In the illustrated embodiment, at step 800 a lost dog notification is transmitted to mobile devices within a geographic region identified by a proximity threshold. This proximity threshold may differ from or be the same as a proximity threshold used to identify target recipients of a related found dog notification. Upon receiving one or more lost dog notifications, a user of a recipient mobile device may navigate to a lost dog menu (step 802) to view general information regarding lost dogs in the area. At step 804, the user may then select a particular lost dog notification to view specific information regarding a lost dog of interest, such as profile and geolocation information, reward information, etc. The lost pet notification may include, for example, a link to lost pet report information or information derived therefrom, contact information for an owner of the lost pet, a link for messaging an owner of the lost pet, and the last known location of the lost pet. As described more fully below, an interactive map may also be presented on the recipient mobile device.

Figure 9:
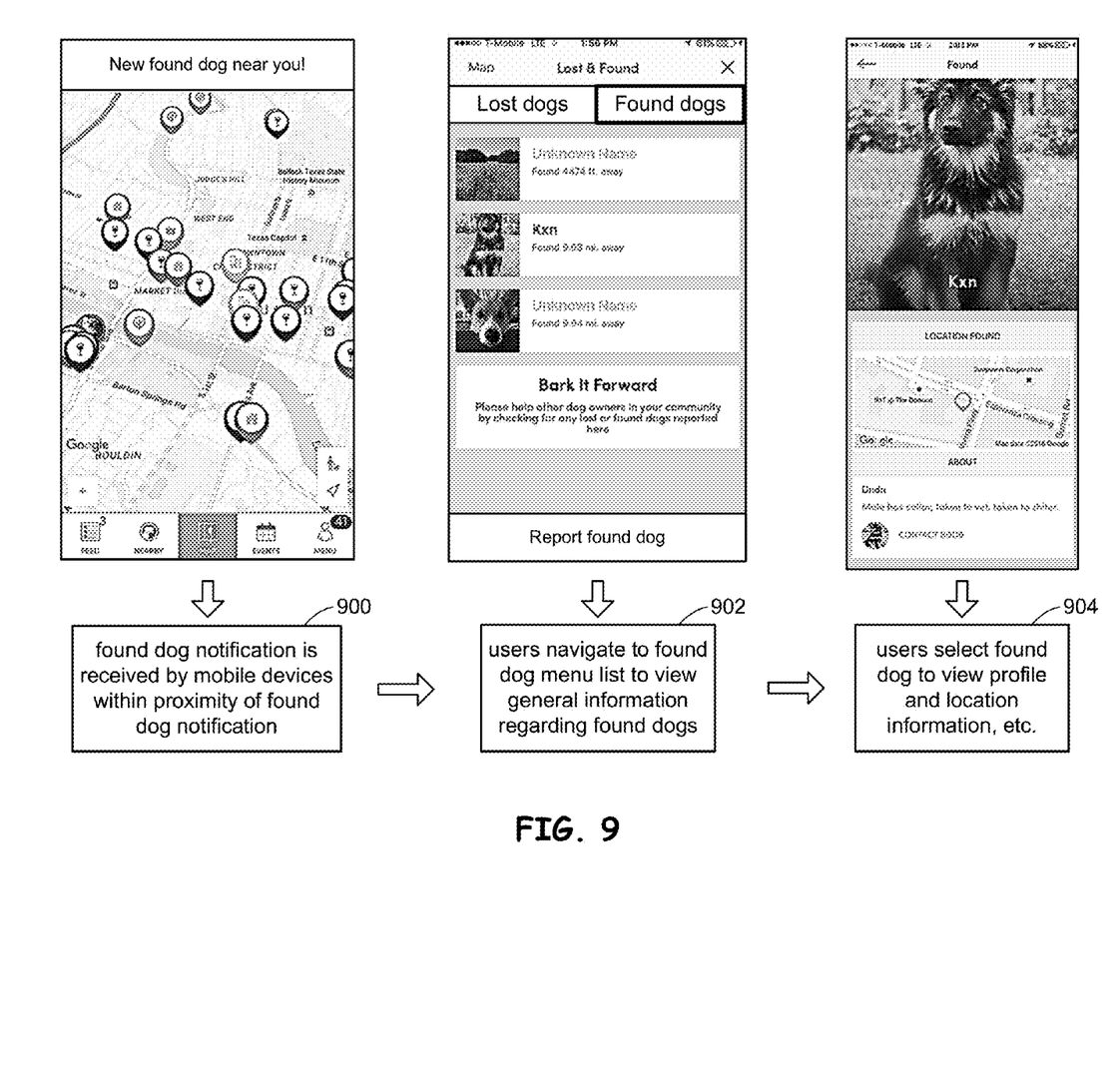
FIG. 9 shows screens shots illustrating options for user selection and display of found pet notifications as presented on a mobile device in accordance with an exemplary embodiment of the present disclosure.

FIG. 9 shows screens shots illustrating options for user selection and display of found pet notifications as presented on a mobile device in accordance with an exemplary embodiment of the present disclosure. In particular, differing found pet notification messages may be accessible under or automatically displayed through a notification section of a user interface.

In the illustrated embodiment, at step 900 a found dog notification is transmitted to mobile devices within a geographic region identified by a proximity threshold. This proximity threshold may differ from or be the same as a proximity threshold used to identify target recipients of a related lost dog notification. Upon receiving one or more found dog notifications, a user of a recipient mobile device may navigate to a found dog menu (step 902) to view general information regarding found dogs in the area. At step 904, the user may then select a particular found dog notification to view specific information regarding a found dog of interest, such as profile information, geolocation information, etc.

In certain embodiments, an interactive map may also be presented at step 900. The interactive map may include location markers or icons for all nearby dogs participating in the lost and found pet alert system, markers for dog friendly parks, bars/restaurants, stores, other miscellaneous dog friendly points of interest, suggested meeting places, upcoming social events, etc. Current lost/found pet report information may be automatically highlighted on the interactive map, and in some contemplated embodiments profile information for other dogs may be accessible by tapping on or otherwise selecting affiliated markers. A found pet notification message and/or text message may be provided by or on behalf of a hosted service, reading (by way of example): "We have a new lost and found pet alert for Kerby!"

The foregoing alert/notification system and methodologies may be utilized in conjunction with entities such as pet shelters, veterinary clinics, dog friendly businesses, etc. that may contribute to or receive various information such as location information, dog profile information, etc. Further, real time tracking information generated via a location tracking device affixed to a dog may be gathered by stand-alone or premises sensors located in such locations.

Figure 10:
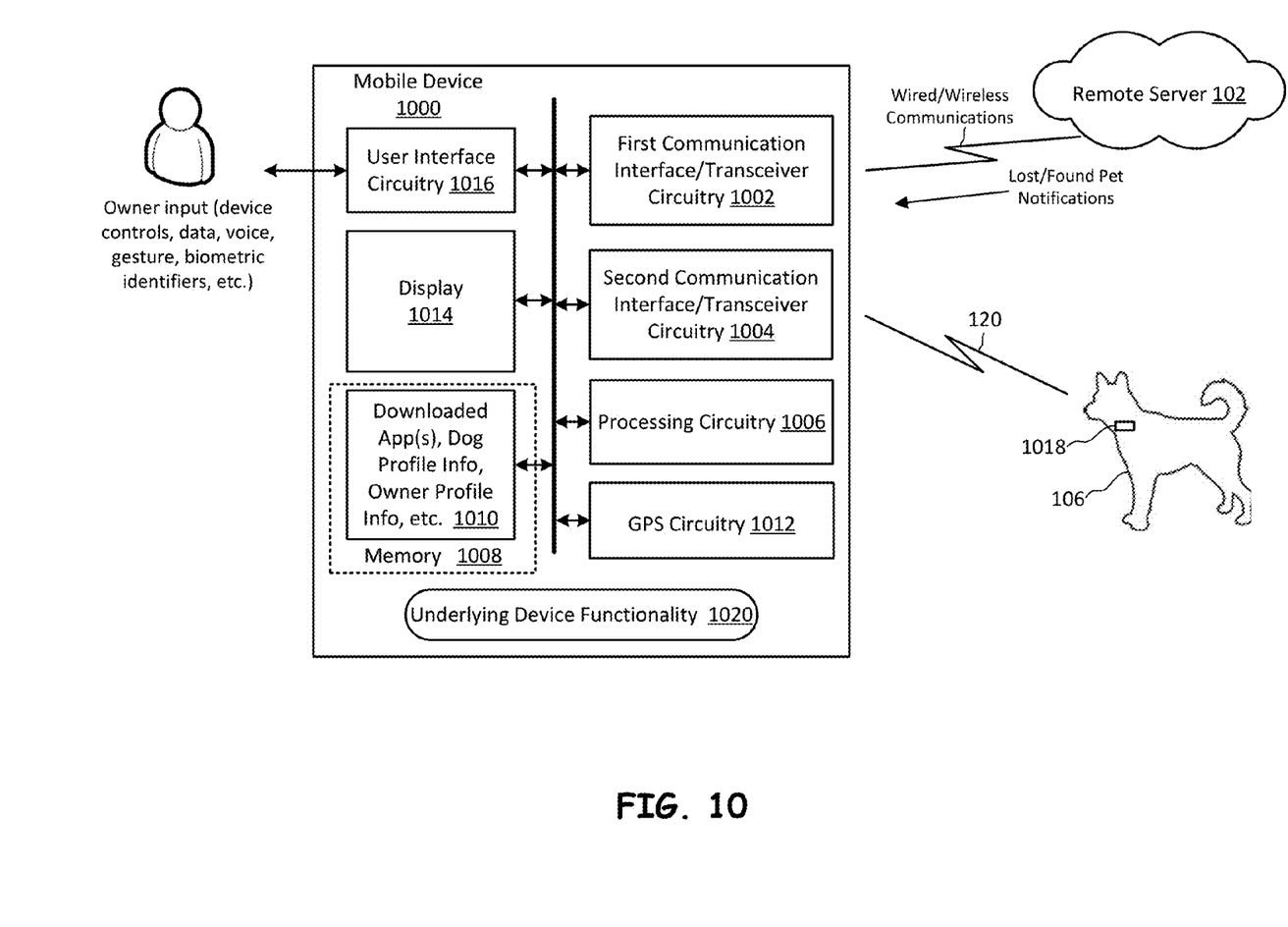
FIG. 10 is a schematic block diagram of an example mobile device configured to support lost and found pet alert/notification operations in accordance with an embodiment of the present disclosure.

Referring now to FIG. 10, a schematic block diagram is shown for an example mobile device 1000 configured to support lost and found pet alert/pet notification operations in accordance with an embodiment of the present disclosure. In the illustrated embodiment, a first communication interface and transceiver circuitry 1002 is operable to perform wireless or wired communications between the mobile device 1000 and a remote server 102 over one or more communication channels. Depending on the capabilities and configuration of the mobile device 1000, communications with the remote server may be unilateral or bidirectional/interactive, and utilize either a proprietary or standardized communication protocol. Communications may include, for example, pet and owner profiling information, lost and found pet report information, geolocation information, lost and found pet alert criteria information, user responses to menu options, lost and found pet notifications, control signals, audio/video content, interactions with hosted service data, relayed information, etc.

The mobile device 1000 further includes a second communication interface and transceiver circuitry 1004 configured to communicate with and receive geolocation information from a location tracking or GPS device attached to or embedded in a pet such as dog 106. In some embodiments, this geolocation information may be relayed to the remote server 102 via the first communication interface and transceiver circuitry 1002. The dog 106 may be owned by a user of the mobile device 1000 and have associated profile information used for lost and found pet alert and social networking purposes. Alternatively, the dog 106 may be a found dog or a nearby lost dog. Geolocation information may be included in profile information entered via the user interface (e.g., zip code of residence, address where the pet resides, indication of current location on an interactive map, etc.), generated automatically by location circuitry/software included in the mobile device, or received from a tracking device 1018 attached to the relevant pet.

In addition, the mobile device 1000 includes processing circuitry 1006 operable to process and manage communications with the remote server 102, execute downloadable applications and other device software, perform graphics processing and security operations, etc. The mobile device 1000 may further incorporate dynamic and/or static memory 1008 for storing, in various embodiments, downloaded or pre-installed application software, pet profile information, owner profile information, etc. (collectively represented as element 1010). The illustrated mobile device 1000 also includes GPS circuitry 1012 and a display 1014 that, at the direction of processing circuitry 1006, presents an interactive user interface such as shown in FIGS. 5-9.

In certain embodiments, a user and/or pet owner interacts with the mobile device 1000 via user interface circuitry 1016. User input to the mobile device 1000 may include, for example, data entry through a keypad, touchscreen, remote control device, gaming controller, device control buttons, voice or gesture commands, storage device, etc. For example, voice or gesture commands may be utilized to trigger lost and found pet alert services such as those described above. Authorized access to or control of the mobile device 1000 can be facilitated through unique biometric identifiers, passwords, token-based identification, and like authentication means. The mobile device 1000 may perform core or underlying functionality 1020. Alternatively, the mobile device may primarily function as a social networking interface or communication device, or be programmable to perform specific functions within a social or lost and found pet alert network. Although not separately illustrated, speaker circuitry may also be included in the mobile device 1000 and be utilized, for example, to provide an audible notification of new lost or found pet alerts.

The interactive user interface may include various options allowing a pet owner or other device user to input profile/preference information relating to a pet. The user interface may be presented, for example, upon opening a downloadable application installed on the mobile device. In addition to the lost/found report information previously described, pet profile/preference information may be entered or viewed including, for example, one or more of dog breed, dog age, dog size, dog temperament, compatibility with other dogs, and preferred activities.

The mobile device also receives and/or generates geolocation information for transmission to a remote server for use in lost and found pet alert operations. Periodic updates to the geolocation information may also be transmitted to the remote server. The mobile device 1000 may be configured to automatically receive a lost or found pet notification from the server, and such notifications may be presented in a visual and/or audio format.

While embodiments of the automated lost and found pet alert system described herein may be supported via one or more features of a downloadable/smartphone application, various functionality may also be supported through a software application for personal computers, or it may reside on a hosted site as an Internet-based application. Similarly, while the automated lost and found pet alert system may be supported by functionality added to an existing smartphone application (e.g., the BARKHAPPY® application), such functionality is equally suitable for incorporation in a stand-alone application or program.

As may be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may also be used herein, inferred coupling (i.e., where one element is coupled to another element by inference) includes direct and indirect coupling between two items in the same manner as "coupled to". As may further be used herein, the term "configured to", "operable to" or "operably coupled to" indicates that an item includes one or more of power connections, input(s), output(s), etc., to perform, when activated, one or more its corresponding functions and may further include inferred coupling to one or more other items. As may even further be used herein, the term "associated with", includes direct and/or indirect association of separate items and/or one item being embedded within another item.

The term "module" is used in the description of one or more of the embodiments. A module includes a processing module, a processor, a functional block, hardware, and/or memory that stores operational instructions for performing one or more functions as may be described herein. Note that, if the module is implemented via hardware, the hardware may operate independently and/or in conjunction with software and/or firmware. As also used herein, a module may contain one or more sub-modules, each of which may be one or more modules.

As may also be used herein, the terms "processing module", "processing circuit", "processing circuitry", "processor" and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments of the present disclosure have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed subject matter. One of average skill in the art will also recognize that the functional building blocks, and other illustrative blocks, modules and components herein, can be implemented as illustrated or by discrete components, application specific integrated circuits, processors executing appropriate software and the like or any combination thereof.

The one or more embodiments are used herein to illustrate one or more aspects, one or more features, one or more concepts, and/or one or more examples of the claimed subject matter. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones. While one or more particular architectures are described herein, other architectures can likewise be implemented that use one or more data buses not expressly shown, direct connectivity between elements, and/or indirect coupling between other elements as recognized by one of average skill in the art.

While particular combinations of various functions and features of the one or more embodiments have been expressly described herein, other combinations of these features and functions are likewise possible. The present invention is not limited by the particular examples disclosed herein and expressly incorporates these other combinations.

What is claimed is:

1. A method of generating lost pet notifications for receipt by mobile devices of pet owners, the method comprising:
    receiving, from a first mobile device, lost pet report information relating to a lost pet, the lost pet report information including first geolocation information;
    establishing a proximity threshold relating to the first geolocation information, the proximity threshold for use in location-based identification of prospective lost pet notification recipients;
    receiving second geolocation information relating to a second mobile device;
    determining, based on the second geolocation information, that the second mobile device is within the established proximity threshold; and
    responsive to determining that the second mobile device is within the proximity threshold, transmitting a lost pet notification for visual presentation on the second mobile device, the lost pet notification including profile information relating to the lost pet.

2. The method of claim 1, wherein the first geolocation information includes information relating to a last known location of the lost pet.

3. The method of claim 2, wherein the information relating to the last known location of the lost pet is derived, at least in part, from information transmitted by a location tracking device attached to the lost pet.

4. The method of claim 1, further comprising:
receiving periodic updates to the first geolocation information.

5. The method of claim 1, further comprising:
receiving, from the second mobile device, found pet report information relating to the lost pet; and
transmitting a found pet notification to the first mobile device.

6. The method of claim 1, wherein the profile information includes previously stored and maintained profile information relating to the lost pet.

7. The method of claim 1, wherein the lost pet notification further includes a link to the lost pet report information or information derived therefrom.

8. The method of claim 1, wherein the lost pet notification further includes at least one of: contact information for an owner of the lost pet, a link for messaging an owner of the lost pet, a last known location of the lost pet, or reward information.

9. The method of claim 1, wherein the first geolocation information is derived from a location tracking device attached to the lost pet, the lost pet report information identifying the lost pet.

10. The method of claim 1, further comprising:
identifying zip code information associated with the first mobile device, wherein the proximity threshold is established based, at least in part, on the zip code information.

11. The method of claim 1, further comprising:
determining, as a precondition to transmitting the lost pet notification, that the second mobile device is configured to receive lost pet notifications.

12. A server comprising:
a communication interface configured to operate via a network to communicate with a plurality of mobile devices;
processing circuitry operably coupled to the communication interface;
memory coupled to the processing circuitry, the memory maintaining a database of profile information relating to pets and pet owners; and
program code stored in the memory, wherein the processing circuitry operates according to the program code to:
receive, from a first mobile device via the communication interface, lost pet report information relating to a lost pet, the lost pet report information including first geolocation information;
establish a proximity threshold relating to the first geolocation information, the proximity threshold for use in location-based identification of prospective lost pet notification recipients;
receive, via the communication interface, second geolocation information relating to a second mobile device;
determine, based on the second geolocation information, that the second mobile device is within the established proximity threshold; and
responsive to determining that the second mobile device is within the proximity threshold, transmit a lost pet notification, via the communication interface, for visual presentation on the second mobile device, the lost pet notification including profile information relating to the lost pet.

13. The server of claim 12, wherein the first geolocation information includes information relating to a last known location of the lost pet.

14. The server of claim 13, wherein the first geolocation information is derived, at least in part, from a location tracking device attached to the lost pet.

15. The server of claim 12, wherein the processing circuitry further operates according to the program code to:
receive, from the second mobile device, found pet report information relating to the lost pet; and
transmit a found pet notification to the first mobile device.

16. The server of claim 12, wherein the lost pet notification further includes at least one of: contact information for an owner of the lost pet, a link for messaging an owner of the lost pet, a last known location of the lost pet, or reward information.

17. The server of claim 12, wherein the processing circuitry further operates according to the program code to:
identify zip code information associated with the first mobile device, wherein the proximity threshold is established based, at least in part, on the zip code information.

* * * * *